United States Patent [19]

Kuttanna et al.

[11] Patent Number: 5,721,867
[45] Date of Patent: Feb. 24, 1998

[54] METHOD AND APPARATUS FOR EXECUTING SINGLE BEAT WRITE STORE INSTRUCTIONS DURING A CACHE STORE LINEFILL OPERATION

[75] Inventors: Belliappa Manavattira Kuttanna; Sung-Ho Park; Rajesh Bhikhubhai Patel, all of Austin, Tex.

[73] Assignees: International Business Machines Corporation, Armonk, N.Y.; Motorola, Inc., Schaumburg, Ill.

[21] Appl. No.: 630,870

[22] Filed: Apr. 1, 1996

[51] Int. Cl.[6] .................................................. G06G 12/12
[52] U.S. Cl. ............................................. 395/468; 395/467
[58] Field of Search ................................. 395/445, 460, 395/467, 468

[56] References Cited

U.S. PATENT DOCUMENTS

| | | | |
|---|---|---|---|
| 5,455,924 | 10/1995 | Shenoy et al. | 395/445 |
| 5,555,392 | 9/1996 | Chaput et al. | 395/445 |
| 5,636,364 | 6/1997 | Emma et al. | 395/467 |

OTHER PUBLICATIONS

Farhas et al., "Complexity/Performance Tradeoffs with Non-Blocking Loads", IEEE, p. 211–222.
Scheurich et al., "The Design of A Lockup-Free Cache For High-Performance Multiprocessors", IEEE, p. 352–359, 1988.

*Primary Examiner*—Eddie P. Chan
*Assistant Examiner*—Kevin L. Ellis
*Attorney, Agent, or Firm*—Andrew J. Dillon

[57] ABSTRACT

A method and apparatus for executing a single beat write (SBW) store instruction during a cache store linefill operation are disclosed. In accordance with the present disclosure, an address associated with the cache memory store linefill operation is first received. This address comprises a tag portion and an index portion. For the cache store linefill operation, the tag portion of this address is sent to a tag latch while the index portion is sent to a burst index latch. During the cache store linefill operation, a second address associated with the single beat write store instruction is received. This second address also comprises a tag portion and an index portion. In response to a determination that a critical word of the cache memory store linefill has been received, the tag portion of the second address is sent to the tag latch and the index portion of the second address is sent to an SBW index latch. By doing so, the single beat write store instruction may be executed before the completion of the cache store linefill operation.

11 Claims, 4 Drawing Sheets

METHOD AND APPARATUS FOR EXECUTING SINGLE BEAT WRITE STORE INSTRUCTIONS DURING A CACHE STORE LINEFILL OPERATION

BACKGROUND

1. Technical Field

The present disclosure relates to a method and apparatus for improved data processing in general and, in particular, to a method and apparatus for executing a single beat write store instruction within a data processing system. Still more particularly, the present disclosure relates to a method and apparatus for executing a single beat write store instruction during a cache store linefill operation within a high-performance data processing system.

2. Description of the Related Art

A high-performance data processing system typically includes both a system memory and a cache memory. A cache memory is a small memory having almost the equivalent speed of a processor, interposed between the processor and the system memory. The cache memory serves as a transparent bridge between the processor and the system memory. The cache memory is transparent in the sense that it is invisible to a user (to "cache" means to hide), and hence, it is also not directly addressable by the user. However, by providing the processor with all the current information the processor requires at a faster speed, the cache memory creates an illusion of having a larger system memory operating at the speed of the processor.

In essence, data may be copied from a portion of the system memory into a data cache memory such that when the data is required by the processor, the data may be available to the processor in a relatively short amount of time. A data cache "miss" occurs when the data requested by the processor cannot be found in the data cache memory. In that case, a cache linefill operation must be performed. If the cache linefill is for a load instruction, it is called a cache load linefill such that after a read "miss," the appropriate data will be brought in from the system memory to fill the cache line. But if the cache linefill is for a store instruction, then it is called a cache store linefill such that after a write "miss," the appropriate data will be brought in from the system memory for update.

Typically, two latches are associated with a cache store linefill operation after a single outstanding store miss. One latch is utilized to hold the store address and the other latch is utilized to hold the store data. The cache store linefill operation is usually performed in a burst, that is, a multiple beat data transfer whose total size is typically equal to the data width of a cache line (a beat is a single data transfer equal to the width of a data bus). If data for a single beat write (SBW) store operation, such as a write-through store instruction, a cache-inhibited stored instruction, or a cache-locked store instruction that is "missed" in the cache, is requested during a cache store linefill operation, the SBW store instruction will not and cannot be serviced until the cache store linefill operation has completed. Depending on the system architecture, a cache store linefill operation for a 32-byte cache line typically lasts approximately 24 cycles. Hence, it is very inefficient to wait for the cache store linefill operation to complete before the SBW store instruction can be executed.

One solution would be an addition of extra latches to hold the address and data associated with the SBW store instruction. However, additional latches and decoding logic circuitry would consume more chip area than a designer would desire. In view of the fact that a single request and multiple requests of a SBW store during a cache store linefill operation occur very frequently, it would be desirable to provide an improved method to execute these SBW store instructions during a cache store linefill operation, without the addition of excessive hardware.

SUMMARY

It is therefore an object of the present disclosure to provide an improved method and apparatus for processing data within a data processing system.

It is another object of the present disclosure to provide an improved method and apparatus for efficiently executing a single beat write store instruction within a data processing system.

It is yet another object of the present disclosure to provide an improved method and apparatus for executing a single beat write store instruction during a cache store linefill operation within a high-performance data processing system.

A method and apparatus for executing a single beat write (SBW) store instruction during a cache store linefill operation are disclosed. In accordance with the present disclosure, an address associated with the cache memory store linefill operation is first received. This address comprises a tag portion and an index portion. For the cache store linefill operation, the tag portion of this address is sent to a tag latch while the index portion is sent to a burst index latch. During the cache store linefill operation, a second address associated with the single beat write store instruction is received. This second address also comprises a tag portion and an index portion. In response to a determination that a critical word of the cache memory store linefill has been received, the tag portion of the second address is sent to the tag latch and the index portion of the second address is sent to an SBW index latch. By so doing, the single beat write store instruction may be executed before the completion of the cache store linefill operation.

All objects, features, and advantages of the present disclosure will become apparent in the following detailed written description.

BRIEF DESCRIPTION OF THE DRAWINGS

The disclosure itself, as well as an illustrative mode of use, further objects, and advantages thereof, will best be understood by reference to the following detailed description of an illustrative disclosure when read in conjunction with the accompanying drawings, wherein.

DETAILED DESCRIPTION OF AN ILLUSTRATIVE EMBODIMENT

An illustrative embodiment under the present disclosure may be implemented on a variety of processors and cache-based data processing system. For the purpose of illustration, an illustrative embodiment as described below is implemented on one of the PowerPC™ line of microprocessors manufactured by International Business Machines Corporation, which operates according to reduced instruction set computing (RISC) techniques.

Figure 1:
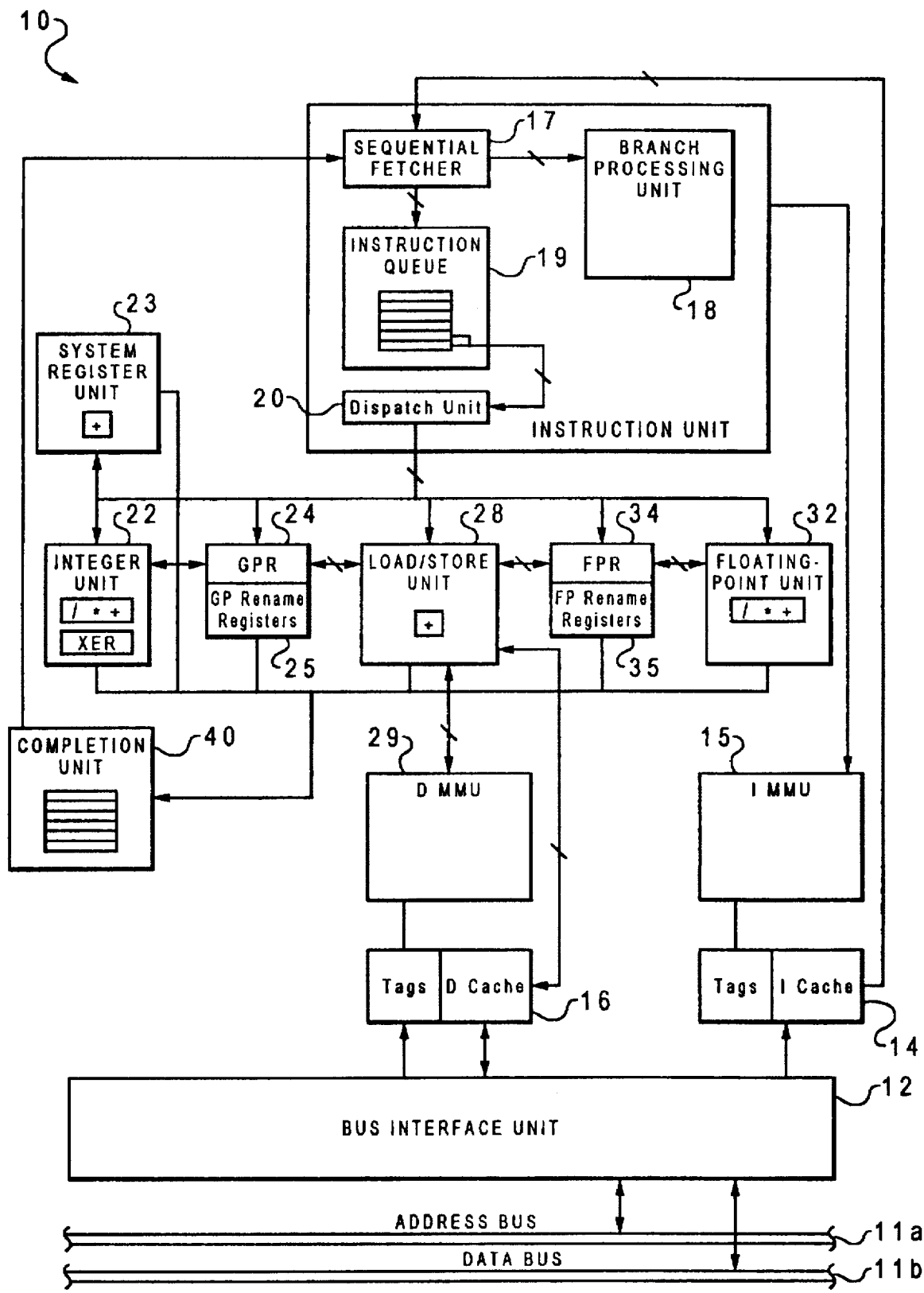
FIG. 1 is a block diagram of an illustrative embodiment of a processor which utilizes the method of the present disclosure.

Referring now to the figures and in particular to FIG. 1, there is illustrated a block diagram of a processor 10 which may be utilized to implement the method and system of the present disclosure. In an illustrative embodiment of the present disclosure, processor 10 is a single integrated circuit superscalar microprocessor, comprising various registers, buffers, execution units, and functional units. As depicted in FIG. 1, processor 10 is coupled to address bus 11a and data bus 11b via a bus interface unit (BIU) 12 within processor 10. BIU 12 controls the transfer of information between processor 10 and other devices, such as a system memory (not shown), that are coupled to address bus 11a and data bus 11b. Processor 10, address bus 11a, data bus 11b, and the other devices coupled to buses 11a, 11b together form a host data processing system.

Within processor 10, BIU 12 is connected to an instruction cache 14 and a data cache 16 in which an illustrative embodiment of the present disclosure may be incorporated. Both instruction cache 14 and data cache 16 are high-speed caches which allow processor 10 to access a subset of instructions or data previously transferred from the system memory in a relatively short amount of time, thus improving the total speed of operation of the host data processing system. Instruction cache 14 and data cache 16 is coupled to instruction memory management unit (MMU) 15 and data MMU 29 respectively. Instruction cache 14 is further coupled to sequential fetcher 17 which fetches instructions from instruction cache 14 during each execution cycle. Sequential fetcher 17 transmits branch instructions fetched from instruction cache 14 to branch processing unit (BPU) 18 for execution, but temporarily stores sequential instructions within instruction queue 19 for later execution by other execution circuitry within processor 10.

In addition to BPU 18, the other execution circuitry of processor 10 includes three execution units, namely, integer unit (IU) 22, load/store unit (LSU) 28, and floating-point unit (FPU) 32. Each of these three execution units may execute one or more classes of instructions, and all execution units operate concurrently during each processor cycle. IU 22 executes all integer instructions and performs mathematical operations utilizing an arithmetic logic unit, a multiplier, a divider, and an integer exception register (XER). General purpose registers (GPR) 24 and GPR rename registers 25 are provided to support integer operations. Conversely, FPU 32 performs floating-point operations, such as floating-point addition, multiplication, and division, on source operands received from floating-point registers (FPR) 34 or FPR rename registers 35. As its name implies, LSU 28 executes all load and store instructions and acts as a data transfer interface between GPRs 24, FPRs 34 and data cache 16. LSU 28 calculates effective address, performs data alignment, and provides sequencing for load/store string and multiple instructions. Further, system register unit 23 executes various system-level instructions, including condition register logical operations and integer add/compare instructions.

Processor 10 employs both pipelining and out-of-order execution of instructions to further improve the performance of its superscalar architecture. Accordingly, instructions can be executed by IU 22, LSU 28, and FPU 32 in any order as long as data dependencies are observed.

Figure 2:
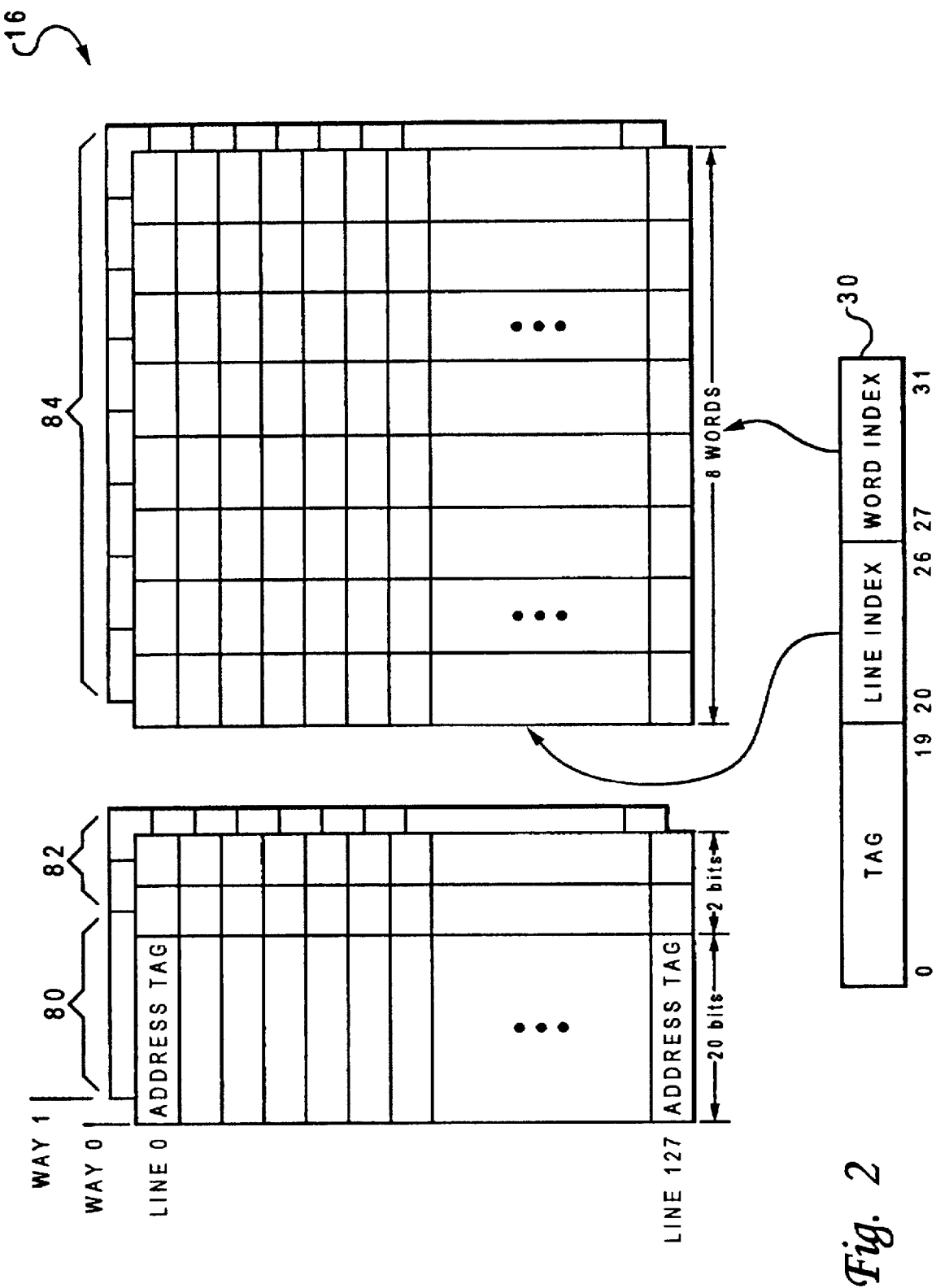
FIG. 2 is a block diagram of a cache memory within the processor of FIG. 1, according to an illustrative embodiment of the present disclosure.

With reference now to FIG. 2, there is depicted a block diagram of the organization of an eight-kilobyte data cache 16 according to a illustrative embodiment of the disclosure. Data cache 16 is configured as a two-way cache-way 0 and way 1, with each way having 128 cache lines, from line 0 to line 127. Each cache line comprises an address tag 80, two status bits 82 and data block 84. Data block 84 is 32 bytes (or 8 words) wide while address tag 80 is only 20 bits wide.

Each cache line is indexed by bits 20–26 of an address 30, and each byte within the cache line is indexed by bits 27–31 of address 30. In addition, address tag 80 within each cache line contains an address tag that is utilized for comparison with bits 0–19 of address 30 in order to determine whether there is a cache "hit" or "miss." A match between address tag 80 in one of ways 0 or 1 and bits 0–19 of address 30 means a cache "hit." Further, status bits 82 are utilized to implement a three-state MEI (modified-exclusive-invalid) cache coherency protocol, a subset of the standard four-state MESI (modified-exclusive-shared-invalid) protocol which is well known to those ordinarily skilled in the art of cache memory design.

LSU 28 of FIG. 1 provides all the logic circuits that are required to calculate effective address, handle data alignment to and from data cache 16, and provide sequencing for load and store instructions. Write operations to data cache 16 can be performed on a byte, half-word, word, or double-word basis. After a write miss (read-with-intent-to-modify) occurs in data cache 16, a burst store linefill is performed as a "critical-word-first" operation such that the critical word is first written to a cache line of data cache 16 before the rest of the data. Data block 84 of the cache line is filled in four beats with 64 bits per beat. When data cache 16 is being filled, data cache 16 is blocked to internal accesses until the completion of the store linefill operation.

Figure 3:
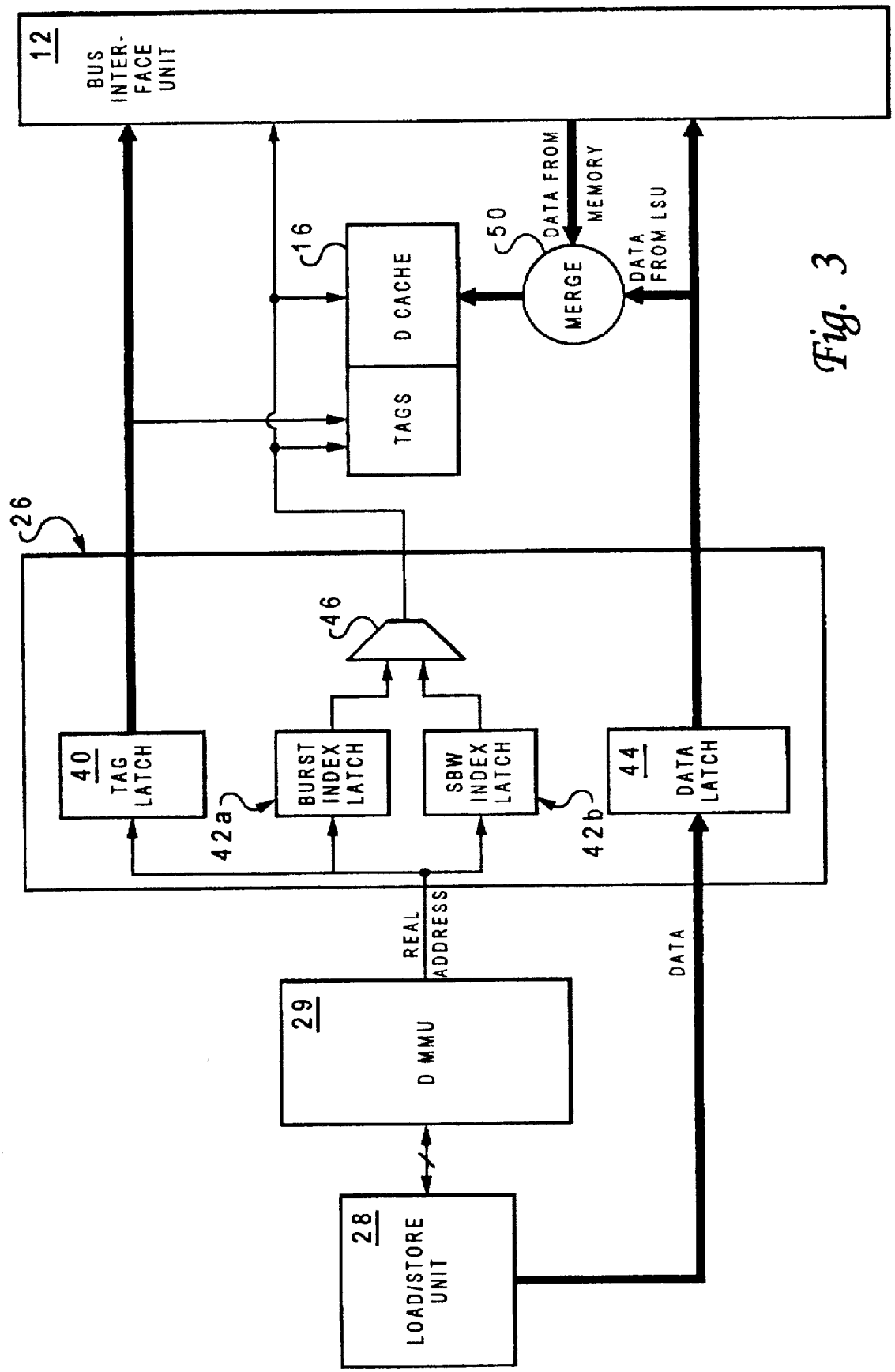
FIG. 3 is a block diagram of an improved address latch for executing single beat write store instructions during a cache store linefill operation, according to an illustrative embodiment of the disclosure.

Referring now to FIG. 3, there is illustrated a block diagram of some improved address latches for executing single beat write store instructions during a cache store linefill operation, according to an illustrative embodiment of the disclosure. Similar to the block diagram in FIG. 1, LSU 28 is coupled to data MMU 29 which provides a real address to data cache 16 via cache controller logic 26. Cache controller logic 26 situates between data MMU 29 and data cache 16, and controls the data flow among LSU 28, data MMU 29, BIU 12 and data cache 16. There are various kinds of control circuitry within cache controller logic 26; however, for the purpose of the present disclosure, cache controller logic 26 comprises four latches, namely, tag latch 40, burst index latch 42a, SBW latch 42b and data latch 44. The outputs of tag latch 40 and data latch 44 are connected to BIU 12. The outputs of burst index latch 42a and SBW latch 42b are connected to data cache 16 via a multiplexer 46.

As shown in FIG. 3, the output of multiplexer 46 is connected to both data cache 16 as well as BIU 12. Thus, an address tag for store linefill may be written to address tag 80 of an appropriate cache line of data cache 16.

From an effective address issued by LSU 28, data MMU 29 provides a real address to cache controller logic 26. The real address, similar to address 30 of FIG. 2, which points to the location of the data in data cache 16 according to the indexing scheme described previously, is sent to tag latch 40 and burst index latch 42a or SBW index latch 42b. As an illustrative embodiment of the present disclosure, bits 0–19 of an address for a burst store linefill is sent to tag latch 40 while bits 20–31 of the same address is sent to burst index latch 42a. Similarly, bits 0–19 of an address for a SBW store is sent to tag latch 40 while bits 20–31 of the same address is sent to SBW index latch 42b.

Data for both store linefill operation and SBW store instruction is sent to data cache 16 through data latch 44. In addition, during a store linefill operation, data from LSU 28 merges with data from the system memory through BIU 12 at merge point 50, and the resultant is written to data cache 16.

Figure 4:
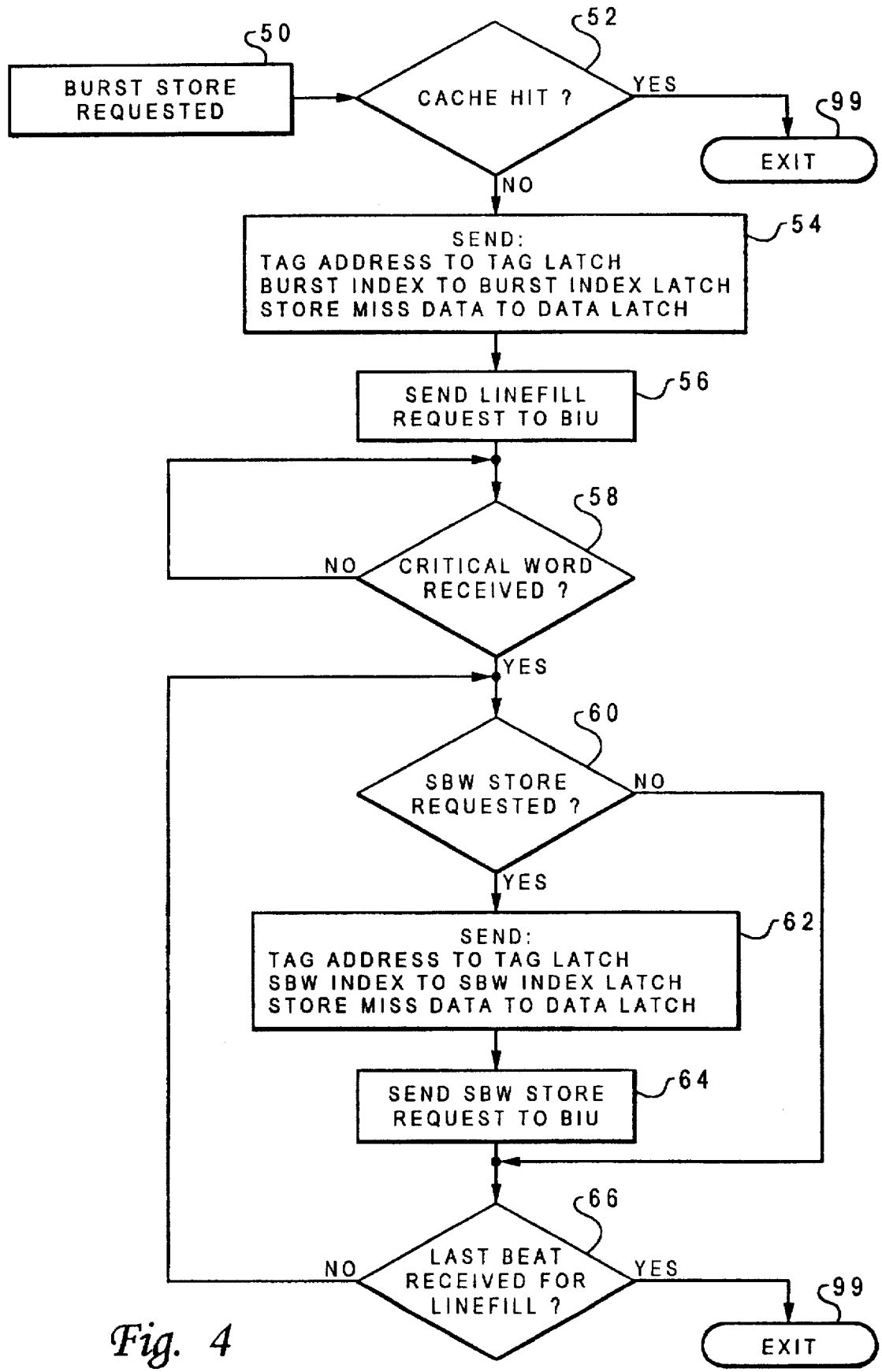
FIG. 4 is a high-level logic flow diagram of the method for executing single beat write store instructions during a cache store linefill operation, according to an illustrative embodiment of the disclosure.

With reference now to FIG. 4, there is illustrated a high-level logic flow diagram of the method for executing an SBW store instruction during a cache store linefill operation, according to an illustrative embodiment of the present disclosure. Starting at block 50, a burst store is being requested. A determination is then made, at block 52, as to whether there is a cache "hit" or not. A cache "hit" means the data is already in data cache 16, and no store linefill is required. Thus, if there is a cache "hit," the stored data within data cache 16 is modified and the process exits at block 99. Otherwise, a burst tag address, a burst index and store miss data are respectively sent (or written) to tag latch 40, burst index tag 42a, and data latch 44, at block 54, such that the burst tag address, the burst index and the store miss data are respectively latched. A request for a cache linefill is then sent to BIU 12 at block 56.

Then, a determination is made at block 58 as to whether a critical word for the cache linefill has been received. For the purpose of this disclosure, the critical word is the first word to be written to a cache line of data cache 16 before the rest of the data. The process continues to loop back to block 58 until the critical word is received. After the critical word has been received, the store data from LSU 28 is merged with the linefill data from the system memory via BIU 12 at merge point 50 of FIG. 3 and the resultant is written into an appropriate data block 84 of data cache 16, indexed by the burst index. Also, the burst tag address in tag latch 40 is written into an appropriate address tag 80 of data cache 16. At this point, tag latch 40 and data latch 44 are no longer required for the completion of the store linefill operation.

At block 60, a determination is made as to whether or not an SBW store is being requested. If there is no outstanding SBW store being requested at this point, the process then proceeds to block 66 to wait for the store linefill operation to complete. Otherwise, if there is an outstanding SBW store being requested, an SBW tag address, an SBW index address and store miss data are respectively sent (or written) to tag latch 40, SBW index latch 42b and data latch 44, at block 62, such that the SBW tag address, the SBW index and the store miss data are respectively latched. A request for an SBW store is then sent to BIU 12 at block 64.

Finally, at block 66, a determination is made as to whether or not a last beat for the store linefill operation has been received. If the last beat for the store linefill operation has not been received, the process loops back to block 60 to determine whether there is a subsequent SBW store request need to be performed; otherwise, the process exits at block 99.

While the disclosure has been particularly shown and described with reference to an illustrative embodiment, it will be understood by those skilled in the art that various changes in form and detail may be made therein without departing from the spirit and scope of the disclosure.

What is claimed is:

1. A method for executing a single beat write instruction during a cache memory operation, said method comprising the steps of:
    receiving a first address associated with said cache memory operation, wherein said first address comprises a tag portion and an index portion;
    writing said tag portion of said first address to a tag latch and writing said index portion of said first address to a first index latch;
    receiving a second address associated with said single beat write instruction, wherein said second address comprises a tag portion and an index portion; and
    in response to a determination that a critical word for said cache memory operation has been received, writing said tag portion of said second address to said tag latch and writing said index portion of said second address to a second index latch, wherein said single beat write instruction is executable before the completion of said cache memory operation.

2. The method for executing a single beat write instruction during a cache memory operation according to claim 1, wherein said method further comprises the step of sending a request for said cache memory operation.

3. The method for executing a single beat write instruction during a cache memory operation according to claim 1, wherein said method further comprises the step of sending a request for said single beat write instruction.

4. The method for executing a single beat write instruction during a cache memory operation according to claim 1, wherein said method further comprises the step of returning to said receiving a second address step.

5. A processor for executing a single beat write instruction during a cache memory operation, said processor comprising:
    means for receiving a first address associated with said cache memory operation, wherein said first address comprises a tag portion and an index portion;
    means for writing said tag portion of said first address to a tag latch and writing said index portion of said first address to a first index latch;
    means for receiving a second address associated with said single beat write instruction, wherein said second address comprises a tag portion and an index portion; and
    means for writing said tag portion of said second address to said tag latch and writing said index portion of said second address to a second index latch, in response to a determination that a critical word of said cache memory operation has been received.

6. The processor for executing a single beat write instruction during a cache memory operation according to claim 5, wherein said cache memory operation is a burst store linefill operation.

7. The processor for executing a single beat write instruction during a cache memory operation according to claim 5, wherein said processor further comprises the means for writing a request for said cache memory operation.

8. The processor for executing a single beat write instruction during a cache memory operation according to claim 5, wherein said processor further comprises the means for writing a request for said single beat write instruction.

9. An apparatus for executing a single beat write instruction during a cache memory operation, said apparatus comprising:
    a tag latch for receiving a tag portion of a first address associated with said cache memory operation and a tag portion of a second address associated with said single beat write instruction;
    a first index latch for receiving an index portion of said first address associated with said cache memory operation, said first index latch is connected in parallel with said tag latch; and
    a second index latch for receiving an index portion of said second address associated with said cache memory operation, said second index latch is connected in parallel with said first index latch.

10. The apparatus for executing single beat write instructions during a cache memory operation according to claim 9, wherein said cache memory operation is a burst store linefill operation.

11. The apparatus for executing single beat write instructions during a cache memory operation according to claim 9, wherein an output of said first index latch and an output of said second index latch are connected to a multiplexer.

* * * * *